Jan. 2, 1923.

P. S. H. NEWELL.
SOUNDING TOY.
FILED JAN. 29, 1921.

1,440,488

Inventor
Peter S. H. Newell
by his Attorney
John F. Nolan

Patented Jan. 2, 1923.

1,440,488

UNITED STATES PATENT OFFICE.

PETER S. H. NEWELL, OF LEONIA, NEW JERSEY, ASSIGNOR TO THE DIAMOND PRODUCTS CORPORATION, OF NEW YORK, N. Y., A CORPORATION OF DELAWARE.

SOUNDING TOY.

Application filed January 28, 1921. Serial No. 440,856.

*To all whom it may concern:*

Be it known that I, PETER S. H. NEWELL, a citizen of the United States, and resident of Leonia, in the county of Bergen and State of New Jersey, have invented certain new and useful Improvements in Sounding Toys, of which the following is a specification.

This invention relates to toys for the amusement of children; and its object is to provide a novel toy of simple and inexpensive yet durable construction which can be manually operated to produce a whirling or flying motion and also a sharp creaking sound. The toy, in its preferred form, represents a bird's nest and a bird hovering adjacent thereto, the construction being such that when the device is operated similarly to a rattle the bird whirls around the nest and a crying noise is produced, as will be hereinafter described; the scope of the invention being defined in the appended claims.

In the drawings—

Figure 1:
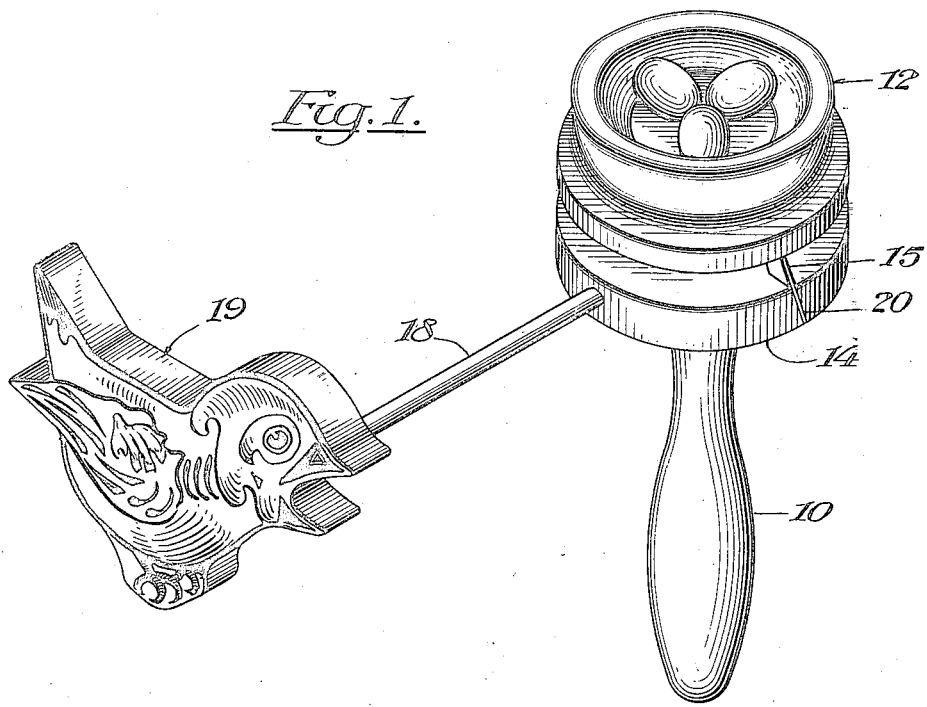
Figure 1 is a perspective view of a toy embodying the principle of my invention.
Figure 2:
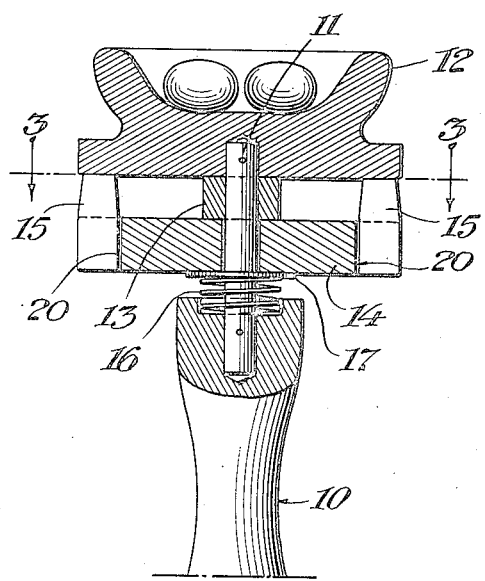
Fig. 2 is a sectional elevation of the upper portion of the handle and its associated parts.
Figure 3:
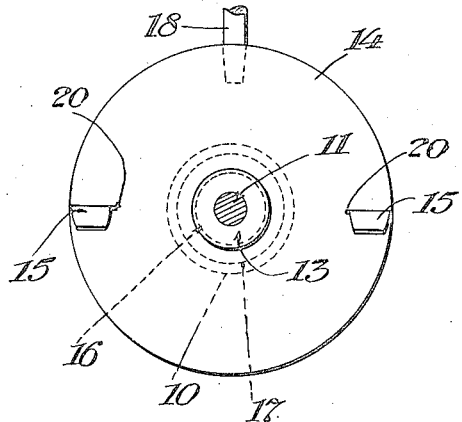
Fig. 3 is a transverse section on the line 3—3 of Fig. 2.

Referring to the drawings, 10 designates a suitable handle having at its upper end a centrally projecting pin 11 to which is fixedly secured in spaced relation to the top of the handle, a sound member 12 which is preferably of wood cup-shaped in simulation of a bird's nest. The under or flat surface of the member 12 has formed on or affixed to it a central collar 13 constituting a hub. Rotatably and slidably mounted on the pin, in the space between the hub and the upper end of the handle, is a second member constituted by a disk 14 of hard wood which is provided at or adjacent its periphery with one or more upwardly projecting inclined tongues 15, the upper or free ends of which are held in frictional contact with the under surface of the member 12. Preferably the frictional pressure is effected and maintained by means of a spring 16 which encircles the pin in the space between the disk and the handle, a bearing washer 17 for the spring being interposed between the upper end of the spring and the disk. Fixed to the disk is one end of a relatively long radially-extending rod 18 to the outer end of which is secured a body 19 in simulation of a flying bird, preferably of an imaginary or grotesque character.

In the present instance the tongues 15 comprise thin blades of hard wood, the lower or basal portions of which are fastened in inclined kerfs 20 in the periphery of the disk so that the projecting upper portions of the tongues will be vibrant. Preferably two tongues diametrically-opposite to each other on the disk and correspondingly-inclined are employed.

By grasping the handle and rotating the device similarly to a rattle, the bird is caused to whirl around the nest and the disk to be rapidly rotated therewith. At the same time the free resilient end of the tongue which is inclined in opposition to the path of rotation of the disk, exerts considerable frictional pressure against the opposing under surface of the disk and in consequence a sharp creaking sound, closely approximating that of a crying bird, is produced.

By the use of two (or more) correspondingly-inclined vibrant tongues arranged in spaced relation to each other, the disk and "nest" are not only peripherally supported in uniform axial position on the pivot pin, but the crying sound is emitted irrespective of the direction of rotation of the device.

It is to be understood that the configuration or design of the toy, as well as the details of construction thereof herein shown and described, can be modified within the principle of my invention and the scope of the appended claims.

I claim—

1. A toy comprising a handle, a sound member thereon, a second member rotatably mounted in spaced relation to said sound member, a vibrant sound-producing tongue fixed to one of said members and extending therefrom toward and against the opposing surface of the other member, said surface being flat and at right angles to the axis of rotation of the member bearing the sound-producing tongue, a rod extending outward from the second member, a body carried by the outer portion of said rod so as to have capacity for whirling motion about the sound member, and resilient means arranged to press one member toward the other and thus maintain the tongue in frictional contact with the opposing surface.

2. A toy comprising a handle, a sound member fixed at one end of said handle, a second member slidably and rotatably mounted in spaced relation to said sound member, a vibrant sound-producing tongue fixed to said second member and extending therefrom against the opposing surface of the sound member, said surface being flat and at right angles to the axis of rotation of the member bearing the sound-producing tongue, a rod extending outward from said second member, a body carried by the outer portion of said rod so as to have capacity for whirling motion about the sound member, and a spring arranged to bear against the second member and maintain the tongue in frictional contact with the sound member.

3. A toy comprising a handle having a projecting pin at one end thereof, a sound member, in simulation of a bird's nest, fixed to said pin, said member having a flat annular surface, a disk slidably and rotatably mounted on said pin and in spaced relation to said sound member, a vibrant tongue fixed to said disk and extending angularly therefrom toward and against the flat annular surface of the said member, a rod extending outward from said disk, a body in simulation of a flying bird carried by the said rod in spaced relation to the nest, and a spring interposed between the body of the handle and the disk so as to press the disk toward the sound member and thus maintain the tongue in frictional contact with the sound member.

4. A toy comprising a handle having a projecting pin at one end thereof, a sound member, in simulation of a bird's nest, fixed to said pin, a second member slidably and rotatably mounted on said pin in spaced relation to the bottom of said sound member, an angularly-disposed vibrant tongue fixed to one of said members, and bearing against the opposing surface of the other member, a rod extending outward from the second member, a body in simulation of a flying bird carried by said rod, and a spring arranged to press the said second member toward the sound member and thus maintain the tongue in frictional contact with the opposing surface.

5. A toy comprising a handle having a projecting pin at one end thereof, a sound member, in simulation of a bird's nest, fixed to said pin, a disk slidably and rotatably mounted on said pin and in spaced relation to said sound member, a series of angularly-disposed vibrant tongues fixed to said member in spaced relation to each other and in frictional contact with the opposing surface of the sound member, a rod extending outward from the disk, a body in simulation of a flying bird carried by said rod, and a spring interposed between the body of the handle and the disk so as to press the disk toward the sound member and thus maintain the tongues in frictional contact with the sound member.

Signed at New York, in the county and State of New York, this 21st day of January, A. D. 1921.

PETER S. H. NEWELL.